United States Patent [19]

Stalick

[11] Patent Number: 5,216,666
[45] Date of Patent: Jun. 1, 1993

[54] 1:N RING-TYPE SIGNAL PROTECTION APPARATUS

[75] Inventor: Victor J. Stalick, Richardson, Tex.

[73] Assignee: Alcatel Network Systems, Inc., Richardson, Tex.

[21] Appl. No.: 806,563

[22] Filed: Dec. 12, 1991

[51] Int. Cl.$^5$ .............................. H04J 3/14
[52] U.S. Cl. .................. 370/16.1; 370/85.12; 371/8.2
[58] Field of Search ............... 370/13, 14, 15, 16, 370/16.1, 55, 85.12; 371/8.1, 8.2, 11.1, 11.2; 340/825.01, 827

[56] References Cited

U.S. PATENT DOCUMENTS 4,347,605  8/1982  Hashizume et al. ............... 370/16.1
5,003,531  3/1991  Farinholt et al. .................. 370/16.1

Primary Examiner—Douglas W. Olms
Assistant Examiner—Melvin Marcelo
Attorney, Agent, or Firm—Dennis O. Kraft; Bruce C. Lutz

[57] ABSTRACT

A system is illustrated that uses a spare or auxiliary add-drop muldem located at each end of N high capacity transport circuits to form a ring-type protection circuit using one additional high capacity transport. This is accomplished by using error detection circuitry to switch all of the auxiliary muldems to be normally in a high speed input/output circuit LOOPed condition but switching the auxiliary muldems on either end of a "bad" circuit to a THRU or open condition upon detection of a problem and allowing signals to be routed through the protection transport mechanism rather than the normal transport mechanism.

7 Claims, 9 Drawing Sheets

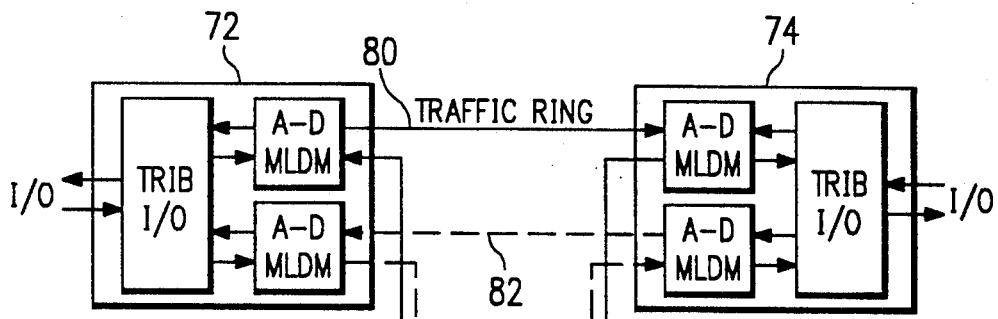
FIG. 3
(PRIOR ART)
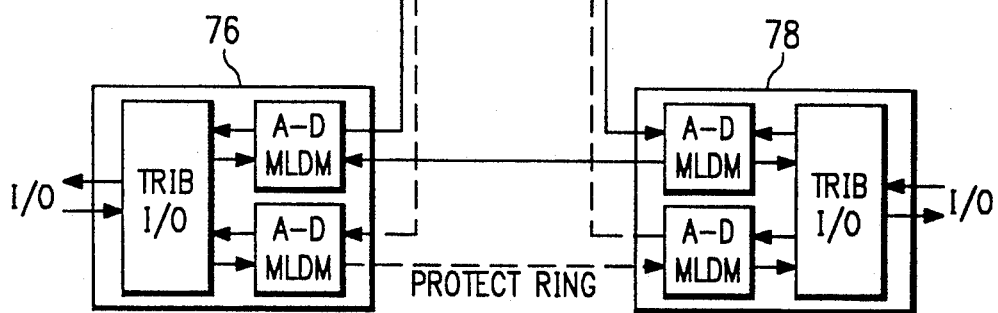

1:N RING-TYPE SIGNAL PROTECTION APPARATUS

THE INVENTION

The present invention is generally related to electronics and more specifically to telecommunication transmission networks and even more specifically to an arrangement of connecting auxiliary add-drop muldems positioned at either end of a plurality of transport lines to form a ring-type protection network.

BACKGROUND

Digital telecommunication transmission networks are normally composed of two types of network elements. A first element is the terminal which terminates the end of a transmission span and distributes the traffic to central office switches and other signal processing equipment. A second element is a regenerator which simply regenerates and retransmits the transported signal at mid span points. A repeater typically comprises two regenerators, normally used for bidirectional traffic paths. Often, the terminal comprises time division multiplex/demultiplex (TDM) equipment as well as the transmit and receive functions. The combination of several traffic channels into one transport channel allows more economical use of the transport media than with separate allocation of transport channels to traffic channels.

A third element has been introduced into network configurations in recent years. This third element is known to those skilled in the art as an add/drop muldem. The add/drop muldem provides the same functionality as back-to-back terminals. In the past, this functionality was achieved through the physical connection of the office input and output connections of one terminal network element to another within the same office. This approach required that each unit be fully equipped with I/O units and that inner office cabling be provided to make the connections. The add/drop muldem element simply combined the muldems, transmitters and receivers in one functional package to eliminate the need for extraneous I/O units and support equipment. Thus, traffic channels whose presence was not required at a location could be passed through to the outgoing traffic with a minimum of processing.

There are two fundamental types of digital telecommunications transmission networks that can be built from the basic network elements discussed supra. These are the linear network and the ring network. The ring network can be built in either a unidirectional or bidirectional format. The unidirectional ring utilizes the add/drop muldem as the base network element. Such a structure utilizes two fibers or transport paths for transmission of traffic between the sites.

It is possible to combine the two types of networks into a single higher transport capacity network to economize on transmission paths usage between two locations. In such a situation, one or more I/O ports may serve as the transmission paths of a unidirectional ring while other I/O ports serve linear networks. The high capacity transport muldems multiplex the various lower rate I/O's into one or more high capacity transport signals.

Protection of the transmission networks can be accomplished in several ways. Linear systems are usually protected through the use of 1:N systems. Ring networks are normally protected on a 1:1 basis using line protected switching or path protected switching on either unidirectional or bidirectional rings. Recent introduction of digital cross-connect systems have introduced the mesh concept of protection switching. Protection against failure of the transport system network elements or interconnecting paths is often provided by 1:N protection switches where N is $\geq 1$ and generally is less than 14. Switching is normally done at the common rate I/O interface to divert traffic from a working system I/O to a dedicated protection channel I/O. A straightforward 1:N switching system may be built with linear network through-put traffic from tributary shelves. Working channels may be designated 1, 2, ... N and the protection channel may be designated P. When the switches are activated, the I/O traffic on the common rate connection into the high capacity transport system is diverted to channel P. Activation of the switches comes from the working channels directly or through protection channels. The switches are normally coordinated on a end-to-end span basis to prevent unnecessary loss of traffic during switching and restoring processes. This type of protection switching system will protect against the loss of traffic from the failure of any one working element or transport path. Failures such as optical fiber cuts normally break all the paths within a site-to-site connection and therefore, cannot be protected through such a network. One of the major disadvantages of this last mentioned network is that the protection channel P is idle most of the time. There are ways in which the previously referenced system can be reconnected to carry low priority traffic during times when it is not needed for protection of a working channel. When a working channel fails, I/O traffic is switched from the protect channel access tributary I/O to the working channel I/O. Control of the switches would be similar to that mentioned previously.

In communication systems where there are diverse rate I/O requirements, additional multiplex/demultiplex devices are added to bring all signals fed to the protection switch to a common rate or format suitable for connection to the protection switches and I/O ports of the transmission equipment. These multiplex/demultiplex devices are called tributary shelves herein.

Additional protection means is commonly placed in the tributary shelves to protect the traffic against failures in the shelves. Most often, these shelves will incorporate 1:1 protection (i.e. main unit, spare unit and a 1:1 switch at the common rate ports of the shelf). Other units within the shelf may be protected in many different ways.

The basic concept of the present invention combines a ring network concept along with tributary shelf protection where the tributary shelf muldens are designed to be add/drop muldems in lieu of the 1:1 protected straight I/O muldems. The add/drop muldems are switched to a LOOPed condition of the high speed I/O terminals to form the ring whose transmission paths connect to the low speed I/O of the high speed transport equipment. The advantage of this configuration over the standard approach is that it is generally less expensive to incorporate the LOOPed/THRU switching capability of the add/drop muldem into the tributary shelf muldems than it is to provide the stand alone 1:N switch hardware/software and tributary shelf muldem protection switching of the referenced prior art. The use of the add/drop muldem permits 1:N switching to be employed on ring networks embedded in a high capacity transmission system. The protection channel can be used in a similar manner to the prior art for low priority traffic or non-critical traffic by installing tributary shelves in the protect channel ring and setting the add/drop muldems to operate normally in the open or THRU mode. When a switch request is made for a working channel to switch to the protect channel ring, these muldems revert to the LOOPed mode described earlier.

Combining the feature of ring transport through a linear high capacity transport with the ring protect 1:N feature permits protection of traffic distributed throughout a campus, building or other environment. Since I/O paths through each of the add/drop muldems can be looped or add/dropped, the composite rate signal from the tributary shelves can be made up of tributary I/O from several shelves as in a unidirectional ring. Protection switching can be accomplished in the same manner as described above with all of the tributary shelves on the ring acting as one. The addition of optical interfaces or electrical line drivers and receivers to the add/drop muldems allows the tributary shelves to be remotely located with almost no penalty. The add/drop muldems can function as regenerators when in the LOOPed mode and thus, reenforce the signal to the next shelf. In addition, the internal workings of these looped muldems can provide performance monitoring and fault location capabilities for the protect ring.

It is therefore an object of the present invention to provide an improved protection mode configuration of a plurality of communication networks having auxiliary units capable of normal and LOOPed configurations similar to that of an add/drop muldem.

Other objects and advantages of the present invention will be apparent from a reading of the specification and appended claims in conjunction with the drawings wherein:

FIG. 3 illustrates a prior art unidirectional ring using add/drop muldems;

DETAILED DESCRIPTION

Figure 1:
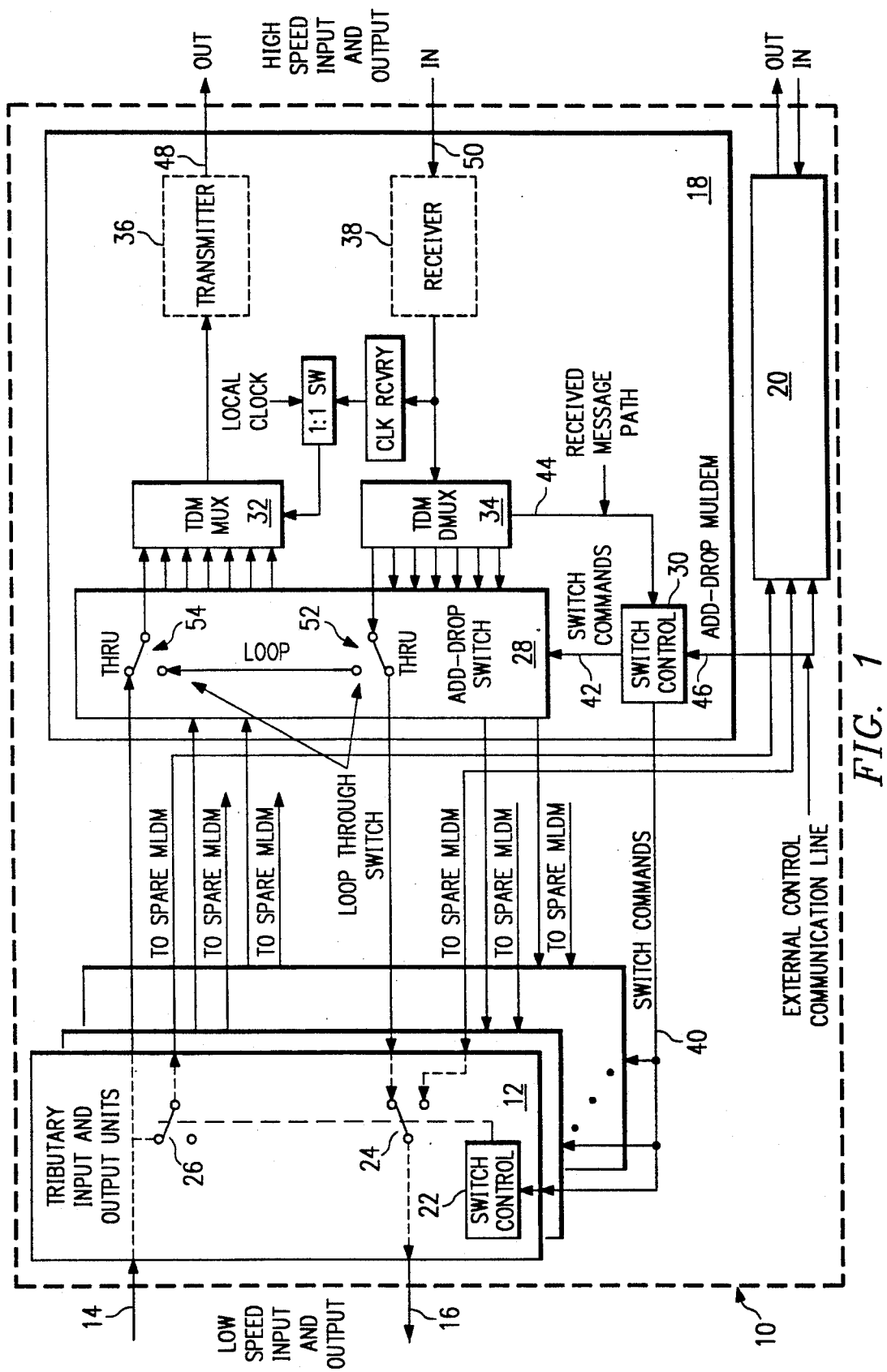
FIG. 1 illustrates a typical tributary shelf incorporating add/drop muldems.

In FIG. 1 a dash line block 10 attempts to illustrate a simplified version of the contents of a typical tributary shelf as configured in accordance with the present invention. Within the shelf 10 there are a plurality of tributary input/output units, the topmost of which is designated as 12. Each of these tributary input/output units 12 is connected to a low speed line for both input and output leads such as 14 and 16. Each of the tributary input/output units such as 12 are further connected to a main or primary add/drop muldem such as 18. A substantially identical spare or auxiliary add/drop muldem 20 is illustrated without any detail. Each of the outputs from the tributary input/output units have spare output signals also connected (but only shown for one unit) to auxiliary add/drop muldem 20. Although leads are connected to spare 20, traffic normally flows through main unit 18. Within each of the tributary input/output units 12, there is a switch control block 22 which controls switches such as 24 and 26 for directing the low speed input/output signals to the auxiliary add/drop muldem upon detection of problems in the normal high speed transport mechanism. Within each of the add/drop muldems 18 and 20, there is an add/drop switch 28, a switch control 30, a TDM MUX or multiplexer and a DMUX or demultiplexer 34 and if appropriate to the circumstances, transmitter and receiver blocks 36 and 38, respectively. As shown, the switch control block 30 provides switch command signals on a set of leads 40 to the various tributary input/output units such as 12 and also provides switch command signals on a lead 42 to the add/drop switch 28. The switch control 30 may receive messages from the high speed input/output transport connections due to error detection means on the line via a lead 44 or it may receive an error indication from other sources via a lead 46. The transmitter 36 provides output signals on a lead 48 to the high speed or high capacity transport mechanism and receive inputs to the 38 are obtained via a lead 50. LOOP/THRU switches 52 and 54 are illustrated within switch 28. Switches 52 and 54 are activated by commands incoming on lead 42. The switches 52 and 54 would normally be in the opposite position for the muldem 20 when the protection circuit is in the standby mode while the switches 52 and 54 would be in the position shown for the main muldem as illustrated. The receiver and transmitter blocks 38 and 36, respectively, are shown in dash lines since they are signal interface blocks and would not be required in all situations.

It should be noted that, for commonality of parts, add/drop muldem 18 is configured idential to block 20. The switches 52 and 54 in block 18 are never activated. In other words, the switches are always left in the condition shown of THRU and normally the only switching that occurs in an add/drop muldem is in the auxiliary muldem shown in FIG. 1 as block 20.

Figure 2A:
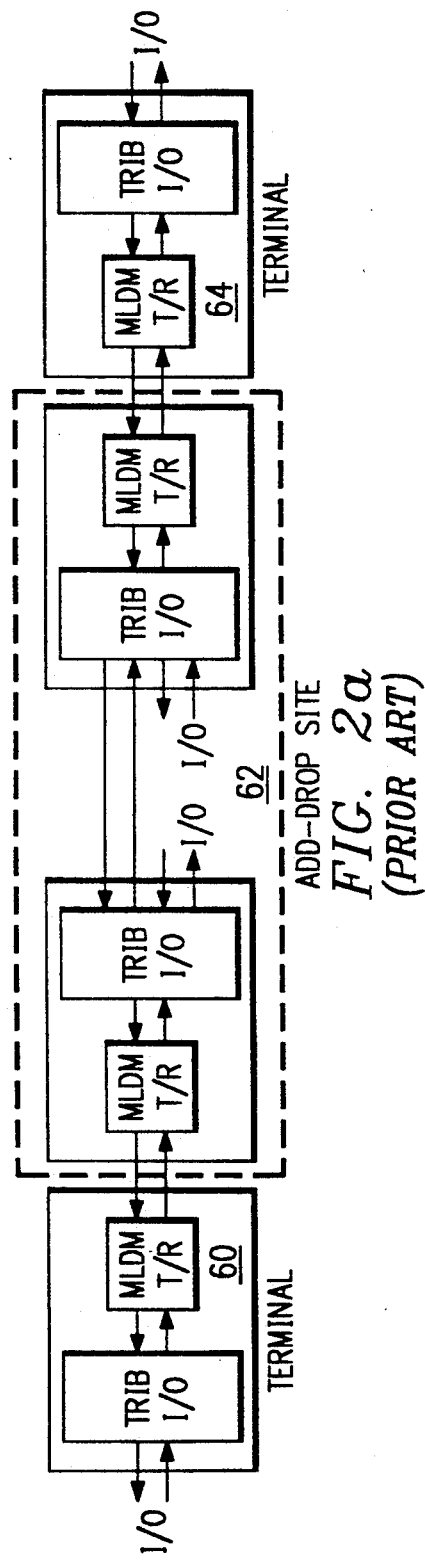
FIGS. 2A and 2B illustrate prior art point-to-point linear systems having add/drop muldems.

In FIG. 2A a linear network is shown with a terminal 60, an add/drop site 62 and a terminal 64.

Figure 2B:
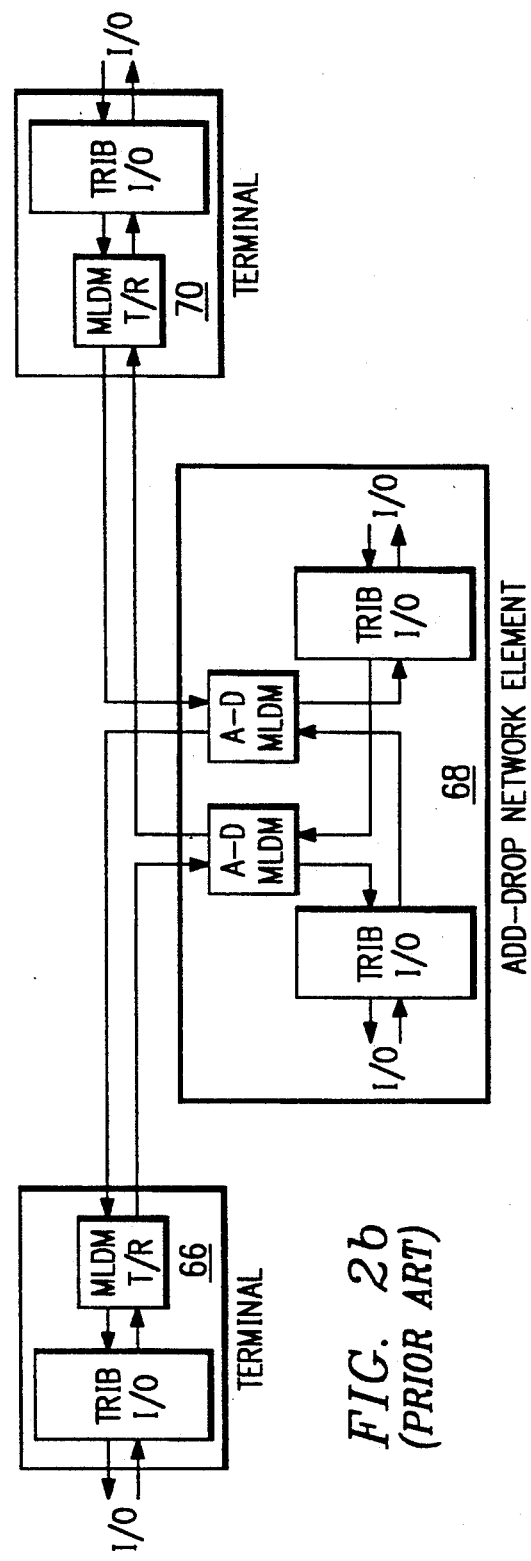

FIG. 2B illustrates the more recent version of a linear network of FIG. 2A and contains a terminal 66, an add/drop network element using add/drop muldems in a block 68 and a further terminal 70. Functionally, FIGS. 2A and 2B perform the same operation but FIG. 2B utilizes newer technology.

In prior art FIG. 3 a unidirectional traffic ring is shown with add/drop muldems as the base network element. There are shown four tributary shelves 72, 74, 76 and 78. A first traffic ring 80 is shown providing a traffic signal path in one direction and a protection ring 82 is shown providing a signal path in the opposite direction so that a break at any point in the line 80 can cause a reconfiguration in the add/drop muldems to bypass the severed portion of the communication link using protection line 82.

Figure 4:
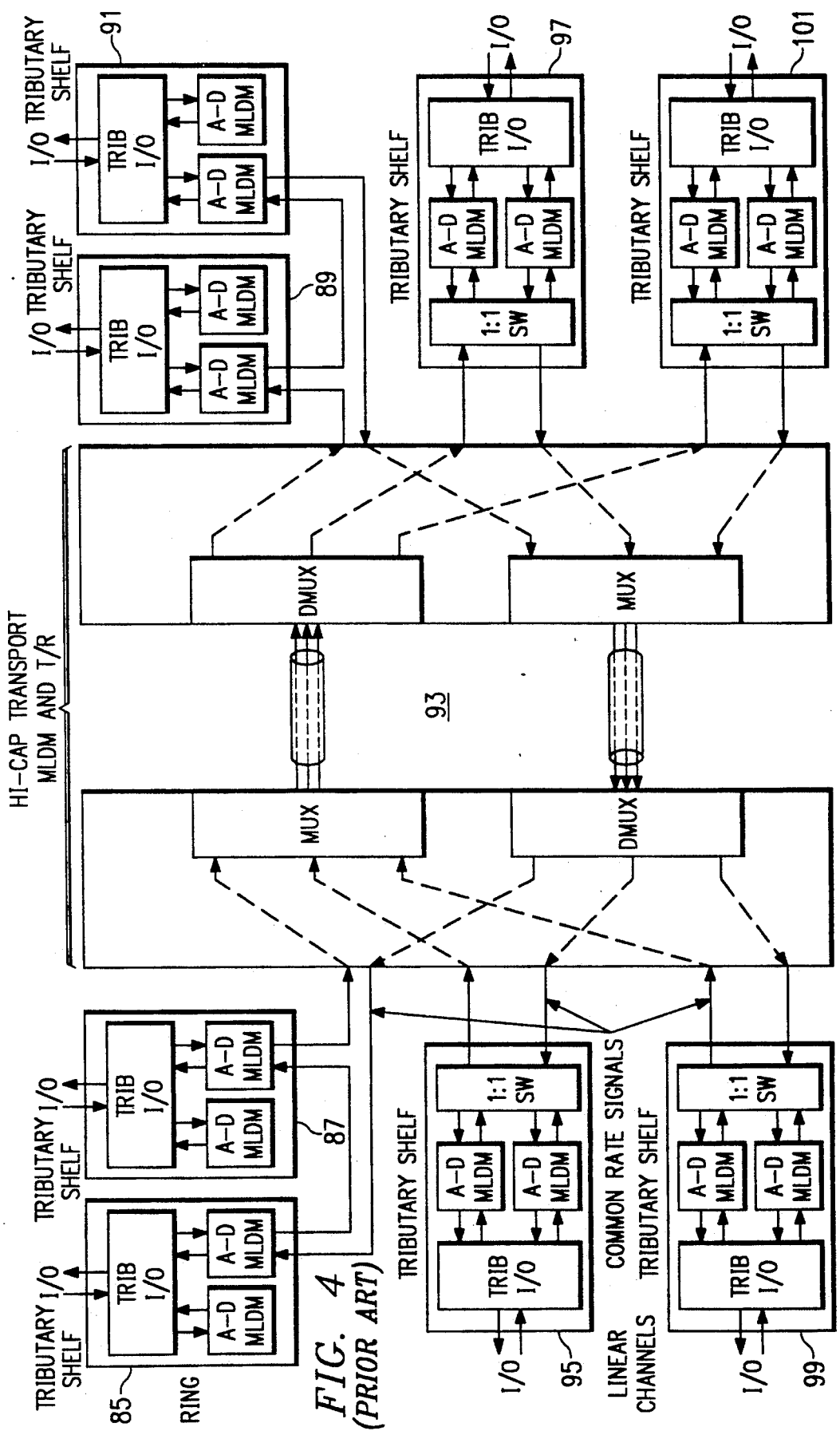
FIG. 4 illustrates a prior art unidirectional ring combined with linear networks all supplying signals through a high capacity transport.

Prior art FIG. 4 shows a simplified view of a single higher transport capacity network using both ring and linear networks. Tributary shelves 85, 87, 89 and 91 are connected through a high capacity transport muldem designated as 93 to form a ring network. Tributary shelves 95 and 97 are interconnected through hi-cap transport muldem 93 to form a first linear network while tributary shelves 99 and 101 are also interconnected through muldem 93 to form a second linear network. The high capacity transport muldem and T/R system 93 can accept the common rate I/O rate tributary shelves 85 through 91 and 95 through 101 and multiplex these signals into the high capacity transport signal used in 93. Within each of the shelves 95 to 101, a 1:1 switch is shown to provide protection against failure of the A-D MLDM units.

Figure 5:
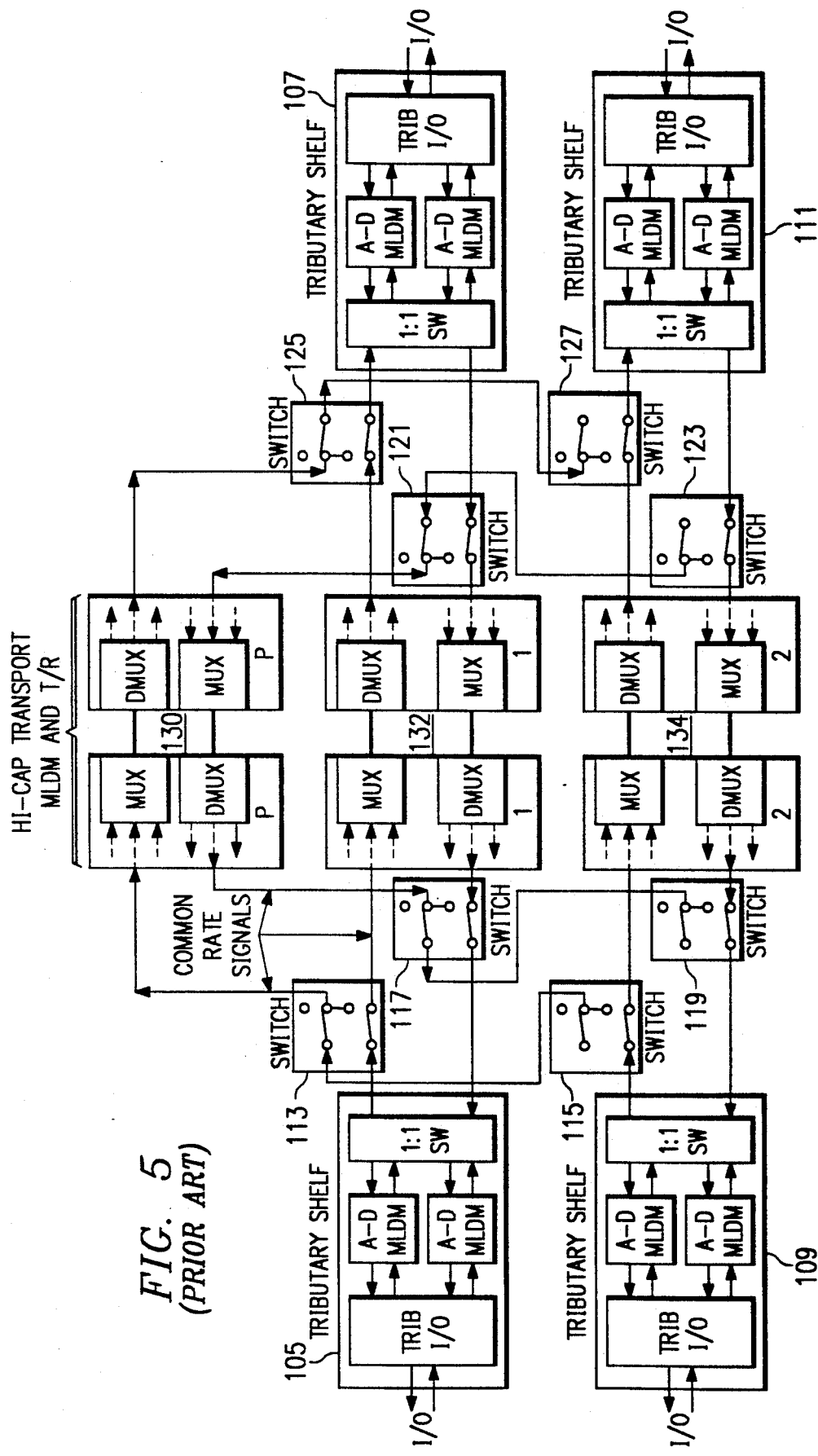
FIG. 5 illustrates a standard prior art 1:N protection configuration having add/drop muldems and the typical switches incorporated in the prior art configurations of a protection scheme.

Prior art FIG. 5 shows tributary shelves 105, 107, 109 and 111 forming N linear networks where N=2. A plurality of switches such as 113, 115, 117 and 119 along with further switches 121, 123, 125 and 127 provide alternate signal paths for the signals from individual tributary shelves on opposite ends of a linear network to a protection circuit high capacity transport muldem designated as 130. The traffic linear network transport muldems may be designated as 132 and 134. In other words, the protection circuit of 130 is protecting the N linear circuits represented by 132 and 134. The switches from 113 to 127 provide appropriate switching to reroute the signals for instance, from tributary shelf 109 to transport muldem 130 and back to switches 123 and 127 for completing the communication to tributary shelf 111 when a failure is detected in the high capacity transport muldem 134.

Figure 6:
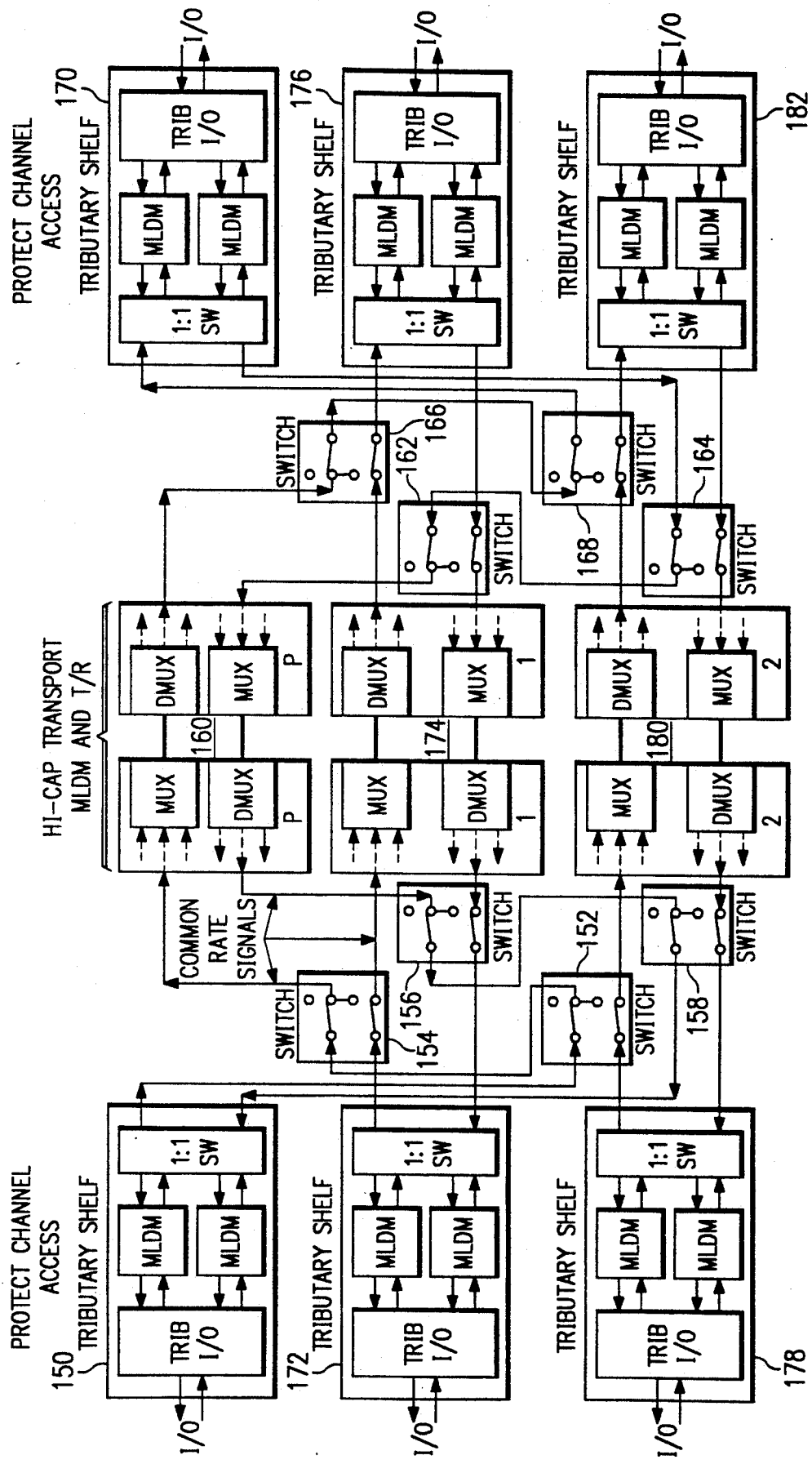
FIG. 6 illustrates the added complexity in the prior art when the protect channel is used for low priority signals if not in the protection mode.

A disadvantage of FIG. 5 is that the protection circuit is idle most of the time. FIG. 6 provides a prior art illustration of a concept using a protection channel P or 160 to carry low priority traffic during times when it is not needed for protection of a working channel. Thus, a protect channel tributary shelf 150 is normally connected through a plurality of switches such as 152, 154, 156 and 158 to the high capacity transport muldem protection channel 160 and from there through further switches 162, 164, 166 and 168 to a protection channel tributary shelf 170. As shown, a first linear network is connected from a tributary shelf 172 through the switches 154 and 156 to a high capacity transport muldem designated as 174, and then through further switches 162 and 166 to a tributary shelf 176. A further linear network is represented by a tributary shelf 178 being connected through switches 152 and 158 to a further high capacity transport muldem 180 and switches 164 and 168 to a tributary shelf 182. The protection circuit from shelves 150 to 170 can normally carry low priority traffic and when a failure is detected in one of the N linear networks such as 174, the appropriate switches such as 154, 156, 162 and 160 will be activated to change the input signal path whereby the signals from the tributary shelves 172 and 176 are passed through high capacity transport 160 rather than through 174. In other words, in the protection mode, tributary shelves 150 and 170 are no longer connected to high capacity transport muldem 160. The activation of the switches such as 154 and 156 may be locally controlled by the tributary shelf detecting the loss of signals or by a central controller (not shown).

Figure 7:
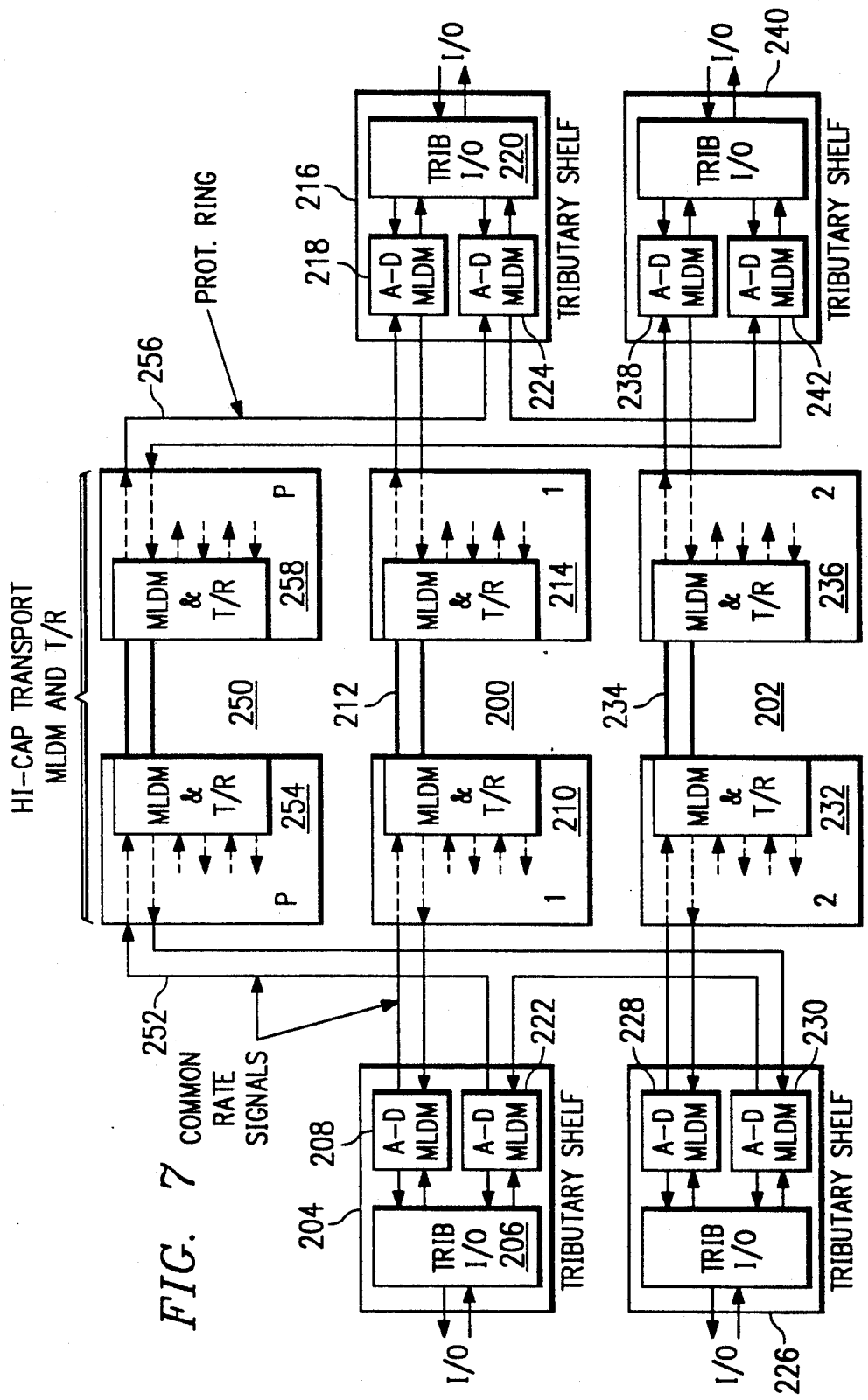
FIG. 7 illustrates the present concept of ring 1:N protection for a set of high capacity transport and presents the simplicity as compared to a similar prior art configuration of FIG. 5.

FIG. 7 illustrates a plurality N, where N=2, of linear networks generally designated as 200 and 202. Linear network 200 commences with low speed I/O signals to a tributary shelf 204 which normally would pass signals from a tributary I/O block 206 to an add/drop muldem 208. The common rate input and output signals from add/drop muldem 208 would be passed to a muldem 210 which is interconnected via high capacity lines generally designated as 212 to a further muldem 214. Block 214 is interconnected with other tributary shelves but specifically shown is a tributary shelf 216 containing a normally used add/drop muldem 218 and a tributary input/output block 220. Tributary shelf 204 has an auxiliary or reserve add/drop muldem 222 while tributary shelf 216 has an additional or auxiliary add/drop muldem 224. The components from block 204 to block 224 illustrate the portions of a linear network. The linear network 202 has similar components with a tributary shelf 226 having a primary add/drop muldem 228 and an auxiliary add/drop muldem 230. The muldem 228 is typically connected to a high capacity muldem 232 which is connected via communication facility 234 to a further high capacity muldem 236. Muldem 236 is connected to an add/drop muldem 238 within a tributary shelf 240. The muldem 240 has an auxiliary add/drop muldem 242. Again, the components from 226 to 242 comprise a second linear network previously designated as 202. A protection ring generally designated as 250 has leads 252 and 256 connected in a loop through all of the auxiliary muldems such as 222, 224, 230 and 242. As will be apparent, this ring could be extended to many linear networks although a typical maximum number would be 14. The common rate signal set of leads 252 connect all the add/drop muldems on one low speed side of a high capacity muldem 254 and leads 256 connect together the add/drop muldems on the other end of the high capacity transport mechanism represented by a muldem 258.

Figure 8:
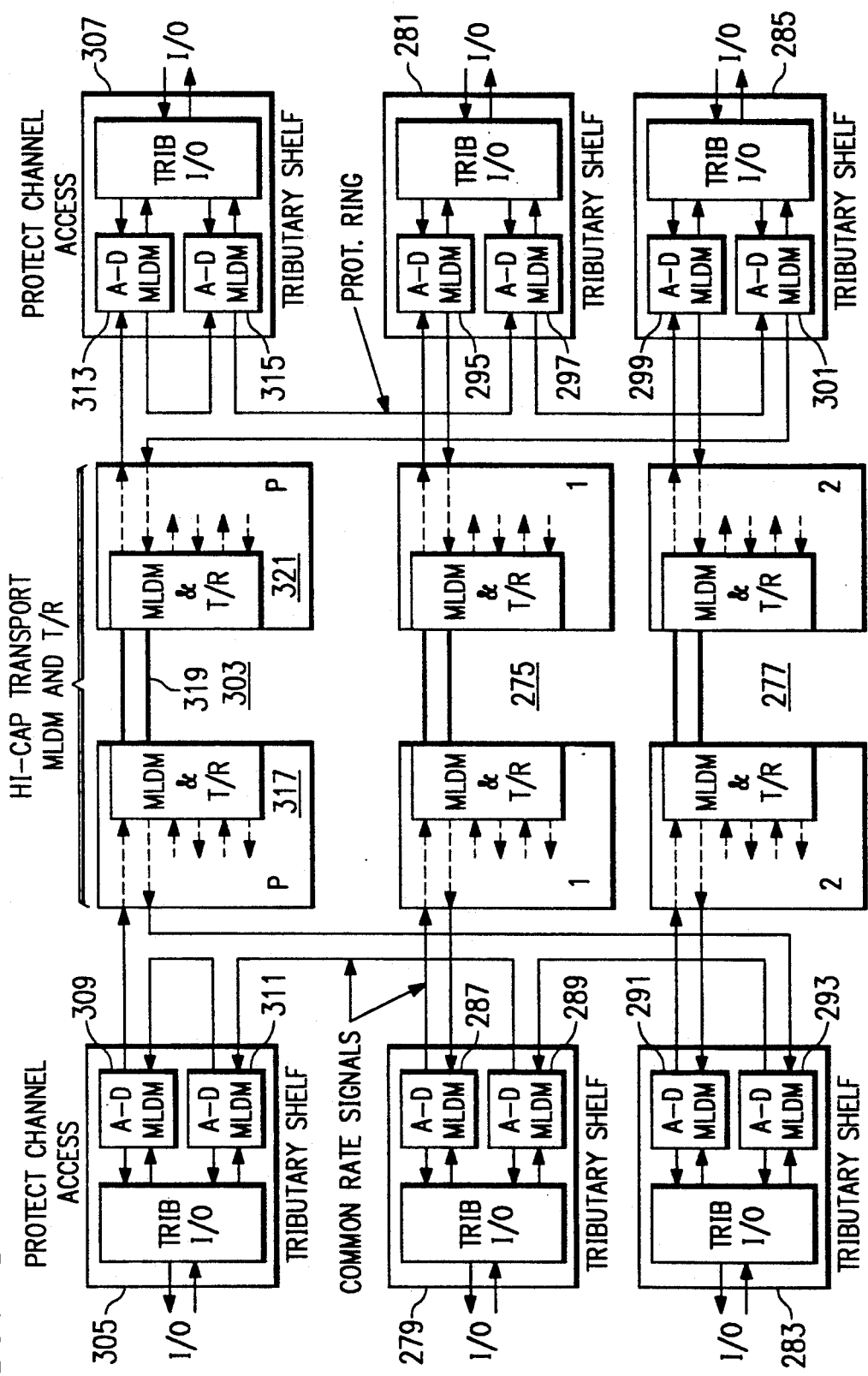
FIG. 8 illustrates a ring 1:N protection for high capacity transport thereby illustrating the simplicity as compared to a similar prior art configuration of FIG. 6.

FIG. 8 illustrates a plurality of linear networks generally designated as 275 and 277. The linear network 275 is shown commencing with a tributary shelf 279 on the left and a tributary shelf 281 on the right. Linear network 277 is shown with a tributary shelf 283 on the left and a tributary shelf 285 on the right. Within the four tributary shelves are shown add/drop muldems 287 through 301 as illustrated with add/drop muldems 287, 291, 295 and 299 being the primary add/drop muldems and the remaining add/drop muldems being auxiliary muldems. A protection channel generally designated as 303 is shown with a lefthand tributary shelf 305 and a righthand tributary shelf 307. Within tributary shelf 305 is a primary add/drop muldem 309 and an auxiliary add/drop muldem 311. Within tributary shelf 307 is a primary add/drop muldem 313 and an auxiliary or secondary add/drop muldem 315. The hardware shown in FIG. 8 is very similar to that of FIG. 7 except for the addition of the tributary shelves 311 and 315 whereby low priority signals can be transmitted between tributary shelves 305 and 307 while passing through the looped outputs of the various auxiliary add/drop muldems as long as there is no communication problem in any of the linear networks being protected. If an error is detected, the add/drop muldems 309 and 313 change from passing through signals from the tributary I/O's of each of the shelves to a looped condition so that signals from one of the linear networks such as 277 may be passed between tributary shelves 283 and 285 via the add/drop muldems 293 and 301. These signals will be passed via a high speed muldem 317, high capacity transport lines 319 and a high capacity muldem 321 rather than the muldems associated with linear network 277 during the failure times of linear network 277. It may be noted that 311 and 315 are normally LOOPed THRU. They are opened when 309 and/or 313 fail. (They are protection for 309 and 313.)

Figure 9:
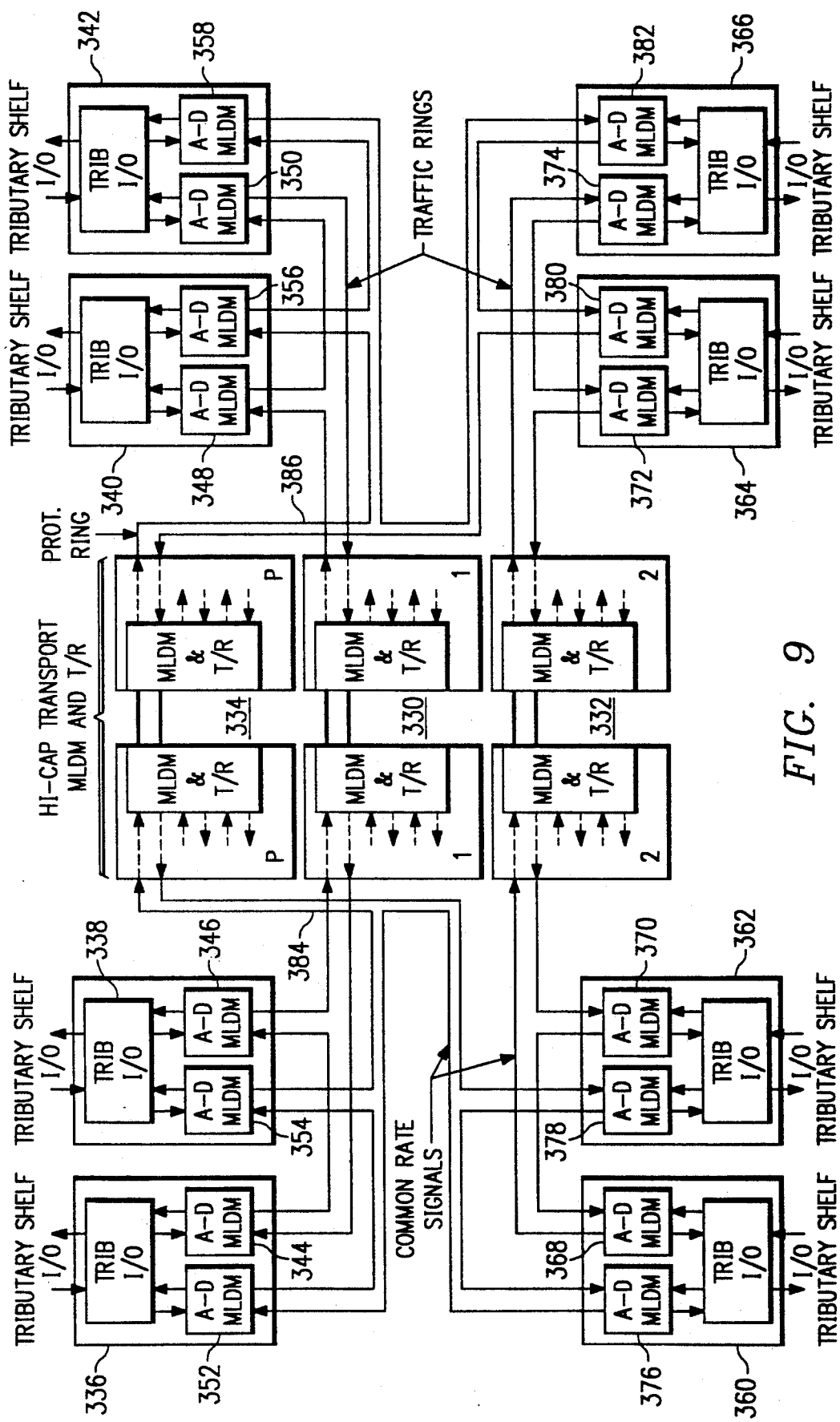
FIG. 9 is a block diagram illustrating a ring 1:N protection and distribution on a high capacity transport where the protection circuit is protecting a plurality of traffic rings.

FIG. 9 illustrates high capacity channels generally designated as 330 and 332 as being part of N channels to be protected by a high capacity protection channel generally designated as 334. Channel 330 receives its signals on a ring network where tributary shelves 336 and 338 on the lefthand side of the drawing are interconnected with appropriate tributary shelves 340 and 342 on the righthand side of the drawing. These tributary shelves are connected through appropriate primary muldems 344 through 350 as shown to the appropriate tributary input/output cards within the tributary shelves 336 to 342. Within the shelves are also add/drop muldems 352 through 358 that are interconnected through a protection ring eventually traversing the high capacity transport designated as 334. The ring network comprising 332 is connected to tributary shelves 360 through 366 having a plurality of primary add/drop muldems 368 through 374 as shown. These tributary shelves 360 through 366 have a plurality of secondary or auxiliary add/drop muldems 376 through 382 connected to the protection ring represented by the high capacity protection transport 334. The protection ring such as designated as 384 on the lefthand side of the page or 386 on the righthand side is at a common data rate similar to that for the lefthand and righthand sides of rings 330 and 332. As will be apparent, an additional set of low priority tributary shelves may be connected to the high capacity muldems of 334 to provide a low priority signal either in a linear form or an additional set of traffic rings in a manner similar to that illustrated in the changes between FIGS. 7 and 8.

OPERATION

As previously mentioned, digital telecommunication transmission networks are normally composed of two types of network elements. One is a terminal which terminates the end of a transmission span and distributes traffic to central office switches and other signal processing equipment and the other is a regenerator which simply regenerates and retransmits transported signals at midspan points between terminals. The terminals typically include time division multiplex equipment as well as transmit and receive functions. The multiplex/demultiplex equipment allows the combination of several traffic channels into one transport channel to provide more economical use of the transport media than separately allocating transport channels to traffic channels. In other words, as used herein, a transport channel is typically intended to refer to a transmission medium having a plurality of multiplexed traffic channels.

The addition of an add/drop muldem into network configurations in recent years to provide the same functionality as was previously obtained using back-to-back terminals at a given site. An add/drop muldem element includes muldems, transmitters and receivers in one functional package to eliminate the need for extraneous I/O units and support equipment. Thus, traffic channels whose presence is not required at a given location can be passed through the element to outgoing traffic with a minimum of processing.

FIG. 1 illustrates a basic functional block diagram of an add/drop muldem. The transmitter and receiver elements 36 and 38 are shown as connection elements to the transport medium such as wire line, optical fiber or radio link but are not necessary in all situations. For this reason, they are shown as dash lines. The add/drop switch 28 is shown with the switches 52 and 54 in the signal through condition. With the two switches in the opposite condition, this add/drop muldem would be in a loop configuration. In other words, a plurality of traffic signals incoming on line 50 would be processed and at least the signals intended for line 16 would be output on line 48. The switch 28 is controlled by signals from switch control 30 which may receive switching commands externally via line 46 or internally such as error messages received on lead 44 as obtained from incoming signals via line 50. If all the traffic channels are looped, the network element forms a regenerator. If none of the channels are looped, the network forms a terminal. Thus, the add/drop muldem of FIG. 1 can be used in any of the major network element positions and, if software controlled, can be easily converted from one to another.

Observing FIG. 1 further, it will be noted that there is a primary or normally used add/drop muldem 18 and an auxiliary or supplemental add/drop muldem 20. The low speed signals input and output at the various tributary input/output units such as 12 are switchably controlled by switches such as 24 and 26 for determining whether they use the primary or auxiliary add/drop muldem. (As should be apparent from the above, the auxiliary muldem 20 serves as a backup or failure protection mechanism for primary muldem 18).

As previously mentioned, FIG. 2 illustrates two prior art linear networks with FIG. 2A showing an add/drop site intermediate two terminals and FIG. 2B showing an add/drop network element situated between two terminals. FIG. 2B has the flexibility of element 68 merely forming a regenerator if no add/drop function is needed.

FIG. 3 illustrates a prior art connection of a uni-directional ring with the connection 80 providing the signal traffic ring and connections 82 providing the protection ring. As illustrated, this structure utilizes two different transport paths for the transmission of traffic between the sites and to provide the main traffic ring and the protection traffic ring.

FIG. 4 illustrates a prior art approach to combining the linear and ring networks into a single higher transport capacity network to economize on transmission path usage between two locations. Although this Figure is a simplified view of the combination, it will be apparent that one I/O port serves the transmission paths of a uni-directional ring and the other two I/O ports of the high capacity transport muldem 93 serve the paths of two linear networks commencing with tributary shelves 95 and 99. The transport muldem 93 multiplexes all of the lower rate bit rates of the common rate signals from each of the tributary shelves whether they be the ring network or the linear network and multiplexes all the signals into a high capacity transport signal.

The protection of telecommunication transmission networks can be accomplished in several ways. One way was shown simplistically in FIG. 3 with the uni-directional ring where the signal is typically transported on the traffic ring and if a break occurs, the protection ring is used instead. Linear systems are typically protected through the use of one or more protection lines switched into use in place of N lines to be protected.

Protection against failure of the transport system network elements or interconnecting paths is provided in many situations by 1:N protection switches where $N \geq 1$ and typically is less than 14. Switching is normally done at the common rate I/O interface to divert traffic from a working system I/O to a dedicated protection channel I/O.

FIG. 5 shows how a typical prior art 1:N switching system, where N is 2, might be built with linear networks supplying traffic between tributary shelves such as 105 and 107 and another linear network of 109 and 111. The protection channel is shown as P and has a designation as 130 in the high capacity transport portion. If a failure is detected in one of the primary high capacity transport muldems such as 132, switches such as 113, 117, 121 and 125 are activated to reroute the signals from tributary shelf 105 through the protection channel 130 and back to muldem 107. Activation of these switches comes from the working channels directly or signals routed through the protection channel. The switches are normally coordinated on an end-to-end span basis to prevent unnecessary loss of traffic during switching and restoral processes. This type of protection switching will protect against the loss of traffic from the failure of any one working network element or transport path. The 1:1 switches in 105, 107, 109, and 111 protect against failure of the A-D MLDM's. When there is a failure such as an optical fiber cut, there is normally a break in all of the paths within a site-to-site connection and thus, such a failure cannot be protected through this type of network.

One of the major disadvantages of a configuration such as shown in FIG. 5 is that the protection channel P is idle most of the time. FIG. 6 illustrates the tributary shelves 150 and 160 added to the structure essentially shown in FIG. 5 whereby the protection channel can be used to carry low priority traffic during times when it is not needed for protection of one of the working channels such as 1 and 2. When a working channel fails, the I/O traffic to the protect channel high speed muldems is switched from the protect channel 150 and is instead received from the working channel I/O such as 178. Control of the switches such as 152 and 158 is the same as previously occurred.

As is known to those skilled in the art, protection of the modules within the tributary shelves such as 172 is accomplished by internal switching and/or unit redundancy.

The present invention is illustrated in FIG. 7 in its most basic form where a ring network concept is employed along with tributary shelf protection when the tributary shelf muldems are designed to be or include add/drop muldems. While FIG. 7 shows a 1:2 configuration showing this concept, it can be expanded to any number N. The advantage of this configuration over the standard approach is that it is generally less expensive to incorporate the looped through switching capability of the add/drop muldem as shown in detail in FIG. 1 than it is to provide the stand alone 1:N switch hardware/software and tributary shelf muldem protection switching illustrated in the prior art figures.

In the normal state, all except two (one on each end) of the add/drop muldems such as 222 and 224 of FIG. 7 are configured in the loop mode. The I/O traffic on each of the tributary shelves is passed through the add/drop muldems such as 208, 218, 228 and 238 and are connected to the working channels such as 200 and 202. The end add/drop muldems 230 and 242 (or any other pair-one at each end) are configured to the open or non-LOOPed state since, as illustrated, they are the end add/drop muldems in the protection channel ring. This approach prevents oscillation of the protection ring.

All the working channels monitor the state of the protection loop either by reading an in-line communication path or by monitoring signals from the other working and/or protection high capacity equipment. When a high capacity transport line or equipment failure occurs, such as with transport 200, a request to switch signal will be passed from the working channel 200 to the tributary shelves such as 204 and 216. This information will also be sent to the other high capacity systems connected to this network such as 202. The protection ring, including lines 252 and 256, is checked to insure that it is not being used for protection of another higher or equal priority working channel. Lower priority traffic will be removed from the ring by configuring the A/D muldems on these shelves from the open or THRU to the LOOPed configuration. If it be assumed that transport 200 is in the failed condition, the add/drop muldems 222 and 224 will be reconfigured from the LOOPed configuration to the THRU, open or non-LOOPed configuration. The I/O traffic from the tributary shelves 204 and 216 will be bridged to protect the add/drop muldem in the transmit direction. This is shown in more detail in FIG. 1 within the tributary input/output block 12 where the transmit signal is always supplied to the primary add/drop muldem and switchably sent to the alternate add/drop muldem 20. This will send the traffic down both the normal traffic and protect common rate and high capacity paths. When the tributary shelf on the receive end of the switching span detects receipt of the new I/O traffic, it will switch to this new path. In the example given it would be tributary shelf 216. It will be noted that in some embodiments, this final step of the switching process can be controlled through messaging between the high capacity protect channel equipment on each end. To complete the loop, the add/drop muldems 230 and 242 need to be reconfigured to the LOOP condition when the add/drop muldems 222 and 224 are altered to a THRU condition.

Reversion of the switches to the normal states will follow the above process in reverse. In other words, the tributary shelves 204 or 216 will sense the removal of the switch request and release the receive end switch. Thus, the transmit source of traffic will be returned from the protect channel to the original set of tributary shelves and the transmit bridging is left as originally.

As may be realized, the switch locking within the tributary shelves and other protect channel functionality can be controlled through embedded communication channels in the protect ring or in direct ties from the protect channel high capacity transport equipment, the tributary shelves and/or the working capacity transport shelves.

In SONET based systems, the bytes designated as K1 and K2 and a standardized algorithm can be used to accomplish signaling required for switch activation on an end-to-end basis and between shelves. The common rate connection may comprise a SONET multiplex signal such as an O/C-3, STSX-3, etc. The K1 and K2 byte signaling is passed end-to-end through the common rate connections to the high capacity equipment and the overhead of the high capacity SONET signal. Thus, the high capacity equipment must have the capability to generate the K1 AND K2 byte switch request when necessary and then to pass the K1 and K2 byte messaging between tributary shelves and the high capacity SONET muldems, and further to monitor the K1 and K2 byte messaging. The switch logic typically will reside in the working and protect channel tributary shelves.

FIG. 7 can be modified to the version shown on FIG. 8 in a manner similar to that between FIG. 5 and FIG. 6 whereby the protect channel 303 can be used for non-critical traffic by installing the tributary shelves 305 and 307 in the protect channel and setting the add/drop muldems 309 and 313 to operate normally in the open or THRU mode. When a switch request is made for a working channel to switch on to the protection channel ring, these add/drop muldems revert to the LOOP mode described earlier. If either of muldems 309 or 313 fail, they revert to the LOOP mode and the respective muldems 311 or 315 revert to the THRU mode.

The linear high capacity transport of FIG. 8 may be modified as shown in FIG. 9 whereby a linear high capacity transport such as 30 is used in a ring configuration for tributary shelves on either side. In other words, tributary shelves 336 and 338 are connected in a ring through the linear high capacity transport 330 to tributary shelves 340 and 342 on the righthand side. The protection ring using high capacity transport 334 can be configured to have leads such as 384 pass through all the auxiliary add/drop muldems such as 352, 354, etc., on the lefthand side and a similar connection on the righthand side. Thus, all the tributary shelves in each of the rings will be provided protection by the one protection ring. Since I/O paths through each of the add/drop muldems can be looped or add/dropped, the composite rate signal from the tributary shelves can be made up of tributary I/O from several shelves as in a uni-directional ring. In this manner, protection switching can be accomplished in a manner similar to that described earlier with all of the tributary shelves on the ring acting as one.

The addition of optical interfaces or electrical line drivers and receivers to the add/drop muldems allows the tributary shelves to be remotely located with almost no penalty. The add/drop muldems function as regenerators when in the LOOPed mode and thus, reinforce the signal to the next shelf. As will be realized, the internal workings of these LOOPed muldems can provide performance monitoring and fault location capabilities for the protect ring.

While I have described several embodiments of protect rings using add/drop muldems, I wish to be limited not by the specific embodiments, but only to the broad concept of using a protect ring interconnected with a plurality of add/drop muldem-type devices to eliminate extraneous switching as used in the prior art for providing protection in other signal paths as claimed in the appended claims wherein I claim:

1. Ring protection apparatus for N circuits comprising, in combination:
   a plurality N of interconnected high capacity transport muldems for communicating N sets of signal paths;
   a protection pair of interconnected high capacity transport muldems for spare capacity protection of any one of said N sets of signal paths;
   M complimentary tributary shelf means, where M is an integer number much larger than N, each for providing multiplexing interfaces between a plurality of low speed signal sources and a given one of said N high capacity transport muldems at a common higher speed data bit rate where a given pair of complimentary shelf means are interconnected through a high capacity transport muldem path, each of said shelf means comprising,
      at least main and spare add-drop muldems each having signal controlled through signal and LOOP signal switch capability, the spare muldem normally being in a LOOP signal condition,
      a plurality M of tributary input/output units each connected for distributing a received signal to at least one of said main and spare add-drop muldems and being switchably controlled to receive a return signal from one of said at least two add-drop muldems, and
      error detection means, connected to said main and spare muldems and said M tributary units, for changing the signal communication path between the M tributary units and the muldems from the main to the spare and for changing the spare muldem from a LOOP to a TRHU condition upon detection of an error condition in the signal path between complimentary shelf units; and
   means interconnecting all of the spare add-drop muldems of said M complimentary tributary units in a ring configuration with said protection pair of interconnected high capacity transport muldems.

2. The method of providing signal path protection for a plurality of signal transmission circuits each interconnecting two physically separate locations comprising the steps of:
   providing switched alternate signal output means for switching between a signal "LOOP" and signal "active" condition upon command at each end of each of N circuits to be protected where there is a "normal", but switchable, signal output apparatus at each end of each of said N circuits;
   providing error detection means for detecting transmission problems in any one of said N circuits, said error detection means normally keeping said alternate signal output means in a LOOP condition and providing commands to reroute signals from said "normal" signal output apparatus to said switched alternate signal output means upon detection of transmission problems in a given one of said N circuits at each end of the signal path; and
   providing a protection signal path normally connected in a ring including the signal loop portion of said alternate signal output means at each end of each of the N circuits to be protected, the signals switched to said protection signal path upon detection of transmission problems flowing throughout said ring in the process of passing from said one end to the other end of an affected one of said N circuits.

3. Protection circuit apparatus for N circuits interconnecting two physical locations comprising, in combination:
   a plurality N of circuits paths each having a first and second end points located in separate common physical locations wherein each end point includes primary and alternate signal processing means each having first and second signal interface means and said first signal interface means of said alternate signal processing means is signal switchable between normal input/output signal and LOOPed input/output signal conditions;

protection circuit path means interconnecting all of the LOOPed input/output signal condition first signal interface means of said alternate signal processing means at said first and second end points of said N circuit paths in a series ring configuration; and error detection means, connected to said primary and alternate signal processing means for changing the signal communication path between said first and second end points from said primary signal processing means to said alternate signal processing means by switching the alternate signal processing means at each end of the circuit path to a normal input/output signal condition upon detection of a signal transmission problem in that circuit path.

4. Apparatus as claimed in claim 3 wherein said primary and alternate signal processing means comprise part of a tributary shelf connected between low capacity and high capacity communication signal transport means.

5. Apparatus as claimed in claim 4 wherein said error detection means comprises a part of each tributary shelf.

6. Protection circuit apparatus for N circuits comprising, in combination:

a plurality N of circuit paths each having first and second end points wherein each end point includes primary and alternate signal processing means each having first and second signal interface means and said first signal interface means of said alternate output means is signal switchable between normal input/output signal and LOOPed input/output signal conditions;

protection circuit path means interconnecting all of the LOOPed input/output signal condition first signal interface means of said alternate signal processing means at said first and second end points of said N circuit paths in a series ring configuration, said protection circuit path comprising part of a low priority communication path for passing signals between first and second end points of an N+1 circuit path during times that said error detection means is not detecting signal transmission problems in any of said N circuit paths; and error detection means, connected to said primary and alternate signal processing means for changing the signal communication path between said first and second end points from said primary signal processing means to said alternate signal processing means by switching the alternate signal processing means at each end of the circuit path to a normal input/output signal condition upon detection of a signal transmission problem in that circuit path.

7. Multiplex circuit path protection apparatus comprising, in combination:

a plurality N of high-speed multiplex signal circuit transport means;

at least one tributary shelf means, including a primary muldem, for communicating with lower speed signal transport means, located at and connected via said primary muldem to each end of said N high-speed multiplex signal circuit transport means;

auxiliary muldems, each having high speed and low speed input/output signal connections, comprising a part of each at least one tributary shelf means, said auxiliary muldems being switchably controlled between normal high speed input/output signal passage and high speed input/output signal LOOPed conditions;

protection circuit means, including further high-speed multiplex signal circuit transport means, connected in a ring through the high speed input/output signal connections of at least one of said auxiliary muldems on each tributary shelf means;

error detection means, associated with each of said N high-speed multiplex signal circuit transport means and connected to each of said auxiliary muldems for switching the auxiliary muldems at each end of a given high-speed multiplex signal circuit transport means having detectable error problems from a signal LOOPed condition to a normal signal passage condition upon detection of an error.

* * * * *